3,259,624
NOVEL HETEROCYCLIC KETONES
Armin G. Wilson, Highland Park, Leonard Weintraub, South River, and Daniel M. Kennedy, East Brunswick, N.J., assignors to Bristol-Myers Company, New York, N.Y., a corporation of Delaware
No Drawing. Original application Sept. 6, 1961, Ser. No. 136,212. Divided and this application Jan. 18, 1965, Ser. No. 426,371
9 Claims. (Cl. 260—247.7)

This application is a division of application Serial No. 136,212 filed September 6, 1961.

This invention relates to novel ketones and their method of preparation. More particularly this invention relates to novel ketones containing an aliphatic portion resulting from breaking the alicyclic ring of a cyclobutane carboxylate. The novel ketones are prepared by reacting a tertiary amino cyclobutane carboxylate with a Grignard reagent and hydrolyzing the resulting reaction product.

The tertiary amino cyclobutane carboxylate reactants of this invention (also referred to herein simply as the cyclobutane reactants) can be represented by the following generic formula:

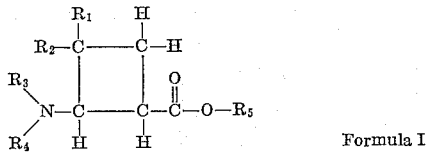

Formula I wherein each of $R_1$, $R_2$, $R_3$, $R_4$ and $R_5$ is an alkyl radical such as one having from 1 to about 6 carbon atoms and preferably one having from 1 to 3 carbon atoms. Also, in the above Formula I the alkyl radicals as represented by $R_3$ and $R_4$ in the tertiary amino group

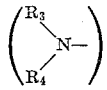

can be joined to form a tertiary amino heterocyclic radical such as a saturated heterocyclic radical containing from 4 to 6 carbon atoms, e.g., 1-piperidino, or even a tertiary amino heterocyclic radical containing a second hetero atom such as oxygen, sulfur, or a second nitrogen as found in a saturated heterocyclic radical having from 3 to 5 carbon atoms, e.g. 4-methyl-1-piperazino, 1-morpholino, 1-thiomorpholino, and the like. The term "(lower) alkyl" or "(lower) alkenyl" are employed herein to denote alkyl or alkenyl radicals having from 1 to about 6 carbon atoms. Also, the term "(lower)" as used with radicals having an alkyl or alkenyl group, e.g. alkphenyl, phenalkyl, etc. describes the alkyl or alkenyl group thereof as one having from 1 to about 6 carbon atoms. A method for preparing the cyclobutane reactants can be found in J. Org. Chem. 26: 625–626 (1961) by K. C. Brannock et al.; and Belgian Patent 593,981 which issued on November 30, 1960, to Eastman Kodak Company and is entitled Cyclobutane Derivatives for Colouring Oils. Illustrative of the cyclobutane reactants, there can be mentioned: methyl 2-dimethylamino-3,3-dimethylcyclobutane carboxylate; ethyl 2-dimethylamino-3,3-dimethylcyclobutane carboxylate; propyl 2-dimethylamino-3,3-dimethylcyclobutane carboxylate; butyl 2-dimethylamino-3,3-dimethylcyclobutane carboxylate; methyl 2-diethylamino-3,3-diethylcyclobutane carboxylate; butyl 2-methylethylamino-3,3-dipropylcyclobutane carboxylate; methyl 2-diisopropylamino-3,3-dimethylcyclobutane carboxylate; ethyl 2-diisopropylamino-3-methyl-3-ethylcyclobutane carboxylate; butyl 2-(4-methyl-1-piperazino)-3,3-dimethylcyclobutane carboxylate; methyl 2-(1-piperidino)-3,3-dimethylcyclobutane carboxylate; methyl 2-(1-morpholino)-3,3-dimethylcyclobutane carboxylate; propyl 2-(1-thiomorpholino)-3,3-diethylcyclobutane carboxylate; methyl 2-(1-pyrrolidino)-3,3-dipropylcyclobutane carboxylate; and the like.

The reaction of an ester with two molar equivalents of a Grignard reagent to produce a tertiary alcohol is well known. It has now been surprisingly found that the cyclobutane reactants of the hereinabove described generic Formula I react readily with two molar equivalents of a Grignard reagent to form an intermediate composition from which novel amino ketones can be obtained by conventional hydrolytic decomposition. The ketones so obtained contain two molar equivalents of the organic radical of the Grignard reagent employed and an aliphatic portion corresponding to a severed alicyclic ring of the cyclobutane reactant. Thus, when the organic portion of the Grignard reagent employed is an aliphatic radical, the resulting novel ketones are aliphatic compounds. The cyclobutane ring opening occurs between the alicyclic ring carbon atom carrying the tertiary amino radical and the alicyclic ring carbon atom carrying the ester radical. One molar equivalent of the Grignard reagent organic radical attaches itself to the cyclobutane reactant ring carbon atom which carries the amino radical, whereas the second molar equivalent of the Grignard reagent organic radical replaces the alkoxy radical ($O-R_5$) of the cyclobutane reactant. The novel ketones thus produced are illustrated in the hereinafter described generic Formula III. Briefly in this novel process, a solution of the cyclobutane reactant is commingled with a solution of a Grignard reagent in a suitable solvent, and the resulting mixture is subjected to temperature and pressure conditions suitable for effecting chemical combination of the cyclobutane reactant and Grignard reagent. The reaction product is then hydrolyzed and decomposed by conventional techniques such as by treating with an acid, a base, or concentrated ammonium chloride to give the novel ketone. The novel amino ketone can then be recovered by conventional techniques such as by extraction of the free amino ketone with ether or other organic solvent immiscible with water, and the extracts are evaporated in vacuo to remove solvent and then distilled to recover the desired product. If the Grignard reaction product is decomposed with an acid, the acid addition salt of the novel amino ketone is produced which is soluble in water. The water soluble acid addition salt is preferably neutralized with a base to convert it to the free amino ketone. Alternatively, the water soluble acid addition salt can be recovered by conventional techniques such as by removing the organic solvent layer, concentrating the aqueous layer to dryness, and preferentially extracting the acid addition salt of the novel amino ketone with an alcohol such as a (lower) alkyl monohydric alcohol. The identity of the product depends, of course, on the specific cyclobutane reactant and Grignard reagent utilized in carrying out the process.

Suitable Grignard reagents which can be employed in this invention have the generic formula:

R—Mg—X        Formula II wherein X is a halogen and R is an organic radical. The Grignard reagents are well known, although for purposes of illustration some typical Grignard reagents will be set forth herein. The letter R in the above generic Formula II represents an organic radical such as an aliphatic, cycloaliphatic or aryl hydrocarbon radical, e.g. a hydrocarbon radical having from 1 to about 12 carbon atoms, an alkoxy substituted hydrocarbon radical; a halogen substituted hydrocarbon radical; an amino substituted hydrocarbon radical free from active hydrogen; or a heterocyclic radical. The hydrocarbon radical can be an alkyl radical, particularly one having from 1 to about 6 carbon atoms, e.g. methyl, ethyl, butyl, n-hexyl, etc.; an alkenyl radical, particularly one having from 1 to about 6 carbon atoms, e.g. vinyl propenyl, etc.; an aryl radical, particularly one having from 6 to 10 carbon atoms such as phenyl or naphthyl; an aralkyl radical, particularly one having from 7 to 12 carbon atoms, e.g. benzyl, phenethyl, etc.; an alkaryl radical, particularly one having from 7 to 12 carbon atoms, e.g. p-methylphenyl, o-methylphenyl, m-ethylphenyl, p-propylphenyl, etc.; or a cycloaliphatic radical, particularly one having from 3 to 6 carbon atoms, e.g. cyclohexyl. Illustrative of alkoxy substituted or halogen substituted hydrocarbon radicals as can be represented by R in the generic Formula II of the Grignard reagents, the following can be mentioned: alkoxy substituted hydrocarbons having from 1 to 6 carbon atoms in the alkoxy radical such as alkoxy substituted phenyls, e.g. p-methoxyphenyl, o-ethoxyphenyl, m-propoxyphenyl, etc.; halogen substituted alkphenyls and particularly those having fluorine substituents, e.g. trifluoromethylphenyl. Illustrative of heterocyclic radicals of the Grignard reagents, there can be mentioned: furyl, pyridyl, etc. Illustrative of amino substituted hydrocarbon radicals of the Grignard reagent free from active hydrogen, there can be mentioned: (lower) dialkylaminophenyl radicals such as 4-dimethylaminophenyl and 4-diethylaminophenyl. The halogen of the Grignard reagent as represented by X in the above generic Formula II can be one such as the chloride, bromide, or iodide and particularly the bromide.

The preparation of Grignard reagents and a wide variety of such reagents are well known in the art, as exemplified by Fuson and Snyder (Organic Chemistry, published by John Wiley and Sons Inc., 1942, particularly pages 259 and 260) or by Richter (Textbook of Organic Chemistry, published by John Wiley and Sons Inc., 1943, particularly pages 162 to 164) or more recently U.S. Patent 2,838,508 and 2,921,940. In a typical case for the preparation of a Grignard reagent an alkyl halide and magnesium in equimolar proportions are agitated at reflux temperature in anhydrous ethyl ether, optionally with a crystal of iodine added as a catalyst, until the magnesium is dissolved. It is essential that anhydrous conditions be maintained and that access of air to the reaction mixture be avoided. Ethyl ether is often employed as the reaction solvent, although other solvents are frequently employed such as isopropyl ether, n-butyl ether, tetrahydrofuran, trimethylamine, triethylamine, and the like. Substantially any halogenated organic compound can be converted into a Grignard reagent with the exception of those compounds which contain functional groups that are attacked by the reagent.

Illustrative of Grignard reagents, there can be mentioned: methylmagnesium iodide; ethylmagnesium iodide; ethylmagnesium bromide; ethylmagnesium chloride; propylmagnesium iodide; propylmagnesium bromide; propylmagnesium chloride; vinylmagnesium chloride; phenylmagnesium cholride; p-chlorophenylmagnesium chloride; 3,4-dichlorophenylmagnesium chloride; o-tolylmagnesium chloride; benzylmagnesium bromide; cyclohexylmagnesium bromide; 2-thienylmagnesium chloride; pyridylmagnesium chloride; 2-quinolylmagnesium chloride; 2-benzothiazolylmagnesium chloride; alpha-furylmagnesium chloride; allylmagnesium chloride; alpha-naphthylmagnesium chloride; 2-furylmagnesium chloride; phenylmagnesium bromide; p-methylphenylmagnesium bromide; o-methylphenylmagnesium bromide; 4-ethoxyphenylmagnesium bromide; 4-methoxyphenylmagnesium bromide; 3-trifluoromethylphenylmagnesium bromide; 4-dimethylaminophenylmagnesium bromide; 3-methoxy phenylmagnesium bromide; and the like.

A preferred procedure for the reaction, hydrolysis, and recovery of the novel ketone products of this invention (hereinafter also referred to as the preferred procedure) is as follows: Two equivalents of magnesium turnings are placed in a thoroughly dried three-necked flask equipped with a sealed glass stirrer, an addition funnel and a reflux condenser to the top of which is attached a drying tube. The turnings are covered with 20 parts by weight of a suitable Grignard solvent such as straight chain or cyclic ether, e.g. diethyl ether, dibutyl ether or tetrahydrofuran. Two equivalents of the appropriate organic halide are placed in the addition funnel along with 6 parts by weight of the same solvent ether. The stirrer is started and the halide is added dropwise to the slurry of magnesium turnings. The rate of addition is adjusted so that the reaction proceeds at a moderate rate. After the addition is complete (about one hour) the solution of organic halide is refluxed for fifteen minutes or heated in the range of 50–100° C., whichever is appropriate for the solvent selected. One equivalent of the cyclobutane reactant is dissolved in about two volumes of solvent such as that used in preparing the Grignard reagent and the solution of the cyclobutane reactant is added dropwise to the solution of organic magnesium halide in the flask at such a rate that gentle refluxing of the solvent is maintained or the temperature is maintained in the range of about 30° C. to about 100° C., whichever is appropriate for the solvent selected. A heavy gray slurry usually results on the addition of the solution of the cyclobutane reactant. The mixture held in the range of about 10° C. to about 120° C. for about one hour is cooled and decomposed by pouring onto an excess of ice and a mineral acid such as sulfuric acid, hydrochloric acid or phosphoric acid. Alternatively, the Grignard complex can be decomposed into the final product by pouring into a concentrated aqueous solution of ammonium chloride or into the cold 30% sodium hydroxide solution. The mixture, if decomposed by acid, is extracted twice with six parts by weight of ether to remove any unreacted organic halide which may be present. The aqueous layer containing the water soluble salt of the novel amino ketone is then treated with sodium hydroxide to increase the pH of the solution to about 10. The product, i.e. the novel ketone which is often a low melting solid or viscous yellow oil, separates at this point. The product is taken up in ten parts by weight of ether, and the ether layer is dried over anhydrous sodium sulfate. The ether is removed in vacuo leaving the product. The reaction product that is obtained by treatment of the total reaction mixture with ammonium chloride or with sodium hydroxide is extracted directly into ether, and the ether solution is dried and concentrated as above. The reaction product (novel ketone) can be purified most advantageously by distillation in vacuo at a pressure of 0.1 to 1.0 mm. of mercury. The boiling points of many of the products range from 160 to 220° C. at pressures below 1 mm. Many of these oily products solidify at room temperatures after distillation and can then be further purified if necessary by recrystallization from such solvents as the lower alkyl alcohols, specifically methanol, ethanol or isopropanol or from the lower saturated hydrocarbons such as n-hexane or n-heptane.

In the novel process of this invention two moles of the Grignard reagent react with one mole of the cyclobutane reactant. It is preferred however that the reaction mixture be charged with a slight excess of the Grignard reagent such as by employing 2.2 moles of the Grignard reagent per mole of cyclobutane reactant. Of course the reaction mixture can be charged with larger or smaller proportions such as about 1 to about 6 moles of the Grignard per mole of the cyclobutane reactant, although the use of proportions which differ substantially from the preferred are not economically desirable.

The reaction of cyclobutane reactant with Grignard reagent is satisfactorily carried out at temperatures of about 30° C. to about 100° C. but higher and lower temperatures can also be used, for example between about 10° C. to about 120° C. The pressure employed is not critical, atmospheric or autogenous pressures being suitable. Decomposition of the cyclobutane-Grignard reagent primary reaction product is preferably effected at temperatures below about 35° C. such as from about 5° C. to 25° C. and particularly about 20° C., suitably with ice or ice water, and preferably with the addition of ammonium chloride in an amount in molar excess of the Grignard reagent employed.

The decomposition product of the reaction can be processed by conventional techniques to recover the novel ketones. A number of such techniques are described herein and additional techniques for recovery can be found in the literature of Grignard reactions.

The novel ketones produced by the process of this invention can be represented by the following generic formula:

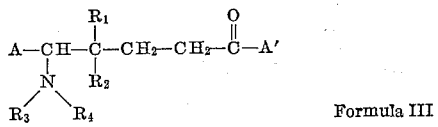

Formula III wherein the radicals represented by $R_1$, $R_2$, $R_3$ and $R_4$ of generic Formula III correspond to the same radicals as represented by the identical letters in generic Formula I of the cyclobutane reactant, i.e. alkyls or in the case of $R_3$ and $R_4$ either alkyls or part of a tertiary amino heterocyclic, whereas the radicals represented by A and A' correspond to the same radicals as represented by R in the Grignard reagent formula R—Mg—X, e.g. alkyl, phenyl, alkenyl, cycloalkyl, alkphenyl, phenalkyl, heterocyclics, and the like.

Illustrative of specific novel ketones as embraced by the above generic Formula III, there can be mentioned:

4,4-dimethyl-5-dimethylamino-1,5-diphenyl-pentanone-1;
4,4-dimethyl-5-diethylamino-1,5-diphenyl-pentanone-1;
4,4-dimethyl-5-dipropylamino-1,5-diphenyl-pentanone-1;
4,4-diethyl-5-dimethylamino-1,5-diphenyl-pentanone-1;
4,4-diisopropyl-5-dimethylamino-1,5-diphenyl-pentanone-1;
4,4-dimethyl-5-dimethylamino-1,5-di(m-tolyl)-pentanone-1;
4,4-diethyl-5-dimethylamino-1,5-di(p-tolyl)-pentanone-1;
4,4-dimethyl-5-dimethylamino-1,5-di(p-tolyl)-pentanone-1;
4,4-dimethyl-5-dimethylamino-1,5-di(p-methoxyphenyl)-pentanone-1;
4,4-dimethyl-5-dimethylamino-1,5-di(o-methoxyphenyl)-pentanone-1;
5,5-dimethyl-6-dimethylamino-heptanone-2;
6,6-dimethyl-7-dimethylamino-nonanone-3;
2,6,6,8-tetramethyl-7-dimethylamino-nonanone-3;
10,10-diethyl-11-dimethylamino heptadecanone-7;
6-methyl-6-ethyl-7-dimethylamino-1,8-nonadiene-3-one;
4,4-dimethyl-5-dimethylamino-1,5-di(m-trifluoromethylphenyl)pentanone-1;
4,4-dibutyl-5-diethylamino-1,5-di(2-quinoyl)-pentanone-1;
4,4-dimethyl-5-dimethylamino-1,5-di(alpha-pyridyl)-pentanone-1;
4,4-dimethyl-5-dimethylamino-1,5-di(p-chlorophenyl)-pentanone-1;
4,4-dimethyl-5-(1-piperidino)-1,5-diphenyl-pentanone-1;
4,4-dimethyl-5-(1-morpholino)-1,5-diphenyl-pentanone-1;
4,4-dimethyl-5-(1-thiomorpholino)-1,5-diphenyl-pentanone-1;
4,4-dimethyl-5-dimethylamino-1,5-di(4-dimethylaminophenyl)pentanone-1;
4,4-dimethyl-5-dimethylamino-1,5-di(3-methoxyphenyl)-pentanone-1;
4,4-dimethyl-5-(4-methyl-1-piperazino)-1,5-diphenyl-pentanone-1;
4,4-diethyl-5-(1-pyrrolidino)-1,5-diphenyl-pentanone-1;
4,4-dimethyl-5-dimethylamino-1,5-di(3,4-dichlorophenyl)-pentanone-1;
4-methyl-4-ethyl-5-diethylamino-1,5-di(2-thienyl)-pentanone-1;
4,4-dimethyl-5-dimethylamino-1,5-dinaphthyl-pentanone-1;
and the like.

The preferred novel ketones of this invention are those produced from Grignard reagents having a phenyl or substituted phenyl radical and are represented by the following generic formula:

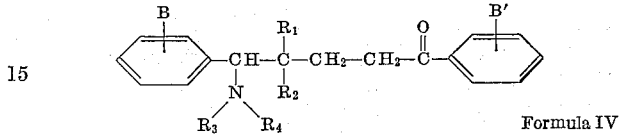

Formula IV wherein each of $R_1$, $R_2$, $R_3$ and $R_4$ is an alkyl radical having from 1 to about 6 carbon atoms, i.e. a (lower)-alkyl, and particularly from 1 to 3 carbon atoms. Each of B and B' in the above generic Formula IV can be hydrogen, an alkyl radical such as one having from 1 to 3 carbon atoms, an alkoxy radical such as one having from 1 to 3 carbon atoms, and halogen substituted alkyl radicals having from 1 to 3 carbon atoms, e.g. a trifluoromethyl radical. The various substituents as represented by B and B' in the above generic Formula IV can be in the ortho, para, or meta position of the phenyl radicals.

The novel process of this invention for producing ketones affords a tool for producing novel and useful compounds which would be difficult to synthesize by other methods. The novel ketones of this invention are valuable for a number of uses. Thus, they possess pharmaceutical activity, e.g. analgesia, and can be used as analgesics. Also, when administered orally they have shown slight anti-inflammatory activity in reducing the swelling of inflamed joints. They can be employed as lubricating oil additives for absorbing and neutralizing acids due to the basic properties imparted by the amino radical. They can be employed as solvents, particularly at temperatures above 75° C., e.g. for dissolving waxes or vegetable oils. Those having a polymerizable radical such as an alkenyl, e.g. vinyl, can be employed as monomers for the production of polymers. Furthermore, the novel ketones of this invention can be employed as chemical intermediates for organic synthesis.

When used as analgesics the novel ketones of this invention can be administered by the conventional methods, the conventional types of unit dosages either alone or with pharmaceutical carriers in analgesicly effective amounts to animals, including humans. The preferred mode for administration of the ketone analgesics is orally.

The term "pharmaceutical carrier" is intended to embrace materials which are conventionally used in the administration of therapeutics in unit dosage form and includes fillers, diluents, binders, lubricants, disintegrating agents and solvents. When the novel ketones are employed as tablets, the conventional binding and disintegrating agents such as those used in analgesic unit dosages can be employed. Illustrative of binding agents, there can be mentioned glucose, gum acacia, gelatin and starch paste. Illustrative of disintegrating agents there can be mentioned corn starch, keratin and potato starch. When the novel ketones or their acid addition salts are administered orally to humans, the quantity thereof can vary from about 0.1 to about 10 grains and preferably from about 0.5 to about 5 grains.

The acid addition salts of the novel ketones employed as therapeutics can be produced by the conventional techniques of neutralizing the amine portion of a compound with either an organic or inorganic acid. Illustrative of the acids, there can be mentioned hydrochloric, sulfuric, citric, acetic, malic, maleic, phosphoric acid, and the like.

The following examples are illustrative of the invention:

EXAMPLE 1

*Preparation of 4,4-dimethyl-5-dimethylamino-1,5-diphenyl-pentanone-1*

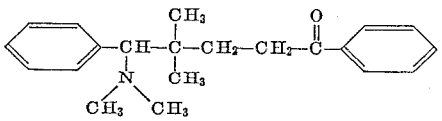

Thirty-nine grams (0.25 mole) of redistilled bromobenzene and 6 grams (0.25 mole) of magnesium turnings were converted into phenyl magnesium bromide in diethyl ether in the manner described in the hereinbefore preferred procedure. 18.7 grams (0.10 mole) of methyl 2-dimethylamino-3,3 - dimethylcyclobutane carboxylate dissolved in two volumes (i.e. 37.4 ml.) of diethyl ether were added dropwise to the phenyl magnesium bromide solution at such a rate as to maintain gentle refluxing. The reaction mixture was stirred continuously. When all of the ester had been added, the gray slurry of solid Grignard adduct was refluxed on the steam bath for one hour. The reaction mixture was cooled and poured into a mixture of 15 ml. of concentrated sulfuric acid and 200 grams of ice. This mixture was extracted three times with 100 ml. of ether. The ether extracts were discarded. The aqueous layer containing the product was brought to pH 10 with 5 normal sodium hydroxide solution. The yellow oil that separated was extracted into ether by shaking the aqueous mixture four times with 100 ml. portions of ether. The combined ether extracts were washed once with 100 ml. of water and dried over anhydrous sodium sulfate. Concentration of the ether in vacuo at a temperature below 60° C. gave the crude product of 4,4-dimethyl-5-dimethylamino-1,5-diphenyl-pentanone-1 which was a thick yellow oil. This oil was distilled in vacuo for purification. Weight of purified product: 25 gms. (81%), B.P. 178–179° C. at 0.5 mm. The purified product crystallized spontaneously at room temperature to a yellow solid having a melting point of 42° C. to 44° C. Infra-red spectra were run on both the distilled and undistilled material and found to be substantially identical.

*Analysis.*—Calculated for $C_{21}H_{27}ON$: C, 81.51; H, 8.80; N, 4.53; and O, 5.17. Found: C, 81.40, 81.34; H, 8.95, 8.79; N, 4.55, 4.73; and O, 5.33, 5.59.

By infra-red examination of the novel ketone of Example 1 absorption peaks were found at the following frequencies expressed as reciprocal centimeters (cm.$^{-1}$): 2820 and 2780 indicating the dimethylamino radical; 1680 indicating a conjugated carbonyl; 1600, 1582 and 1500 indicating benzene; 755 and 705 indicating monosubstituted benzene. No absorption peaks were found above 3200 indicating the absence of the hydroxyl radical. A 2,4-dinitrophenylhydrazone derivative of the novel ketone was prepared by the method described in Shriner, Fuson and Curtin, "The Systematic Identification of Organic Compounds," John Wiley and Sons Inc., New York (1956), Fourth Edition, page 219. After recrystallization from ethanol this derivative melted at 232–232.5° C.

*Analysis.*—Calculated for $C_{27}H_{31}O_4N_5 \cdot H_2SO_4$: C, 55.19; H, 5.66; N, 11.92; and S, 5.44. Found: C, 54.61; H, 5.80; N, 11.87; and S, 5.21.

An adduct of the novel ketone of Example 1 with sodium bisulfite was prepared by the method described in the above Shriner et al. reference, page 149.

*Analysis.*—Calculate for $C_{21}H_{28}O_4SNNa$: N, 3.40. Found: N, 3.44, 3.22.

An oxime of the novel ketone of Example 1 was prepared as described in the above Shriner et al. reference, page 255, Method B. After recrystallization from ethanol this derivative melted at 131–2° C.

*Analysis.*—Calculated for $C_{21}H_{28}N_2O$: C, 77.73; H, 8.70; N, 8.63. Found: C, 77.16; H, 8.72; N, 8.86.

EXAMPLE 2

*Preparation of 4,4-dimethyl-5-dimethylamino-1,5-di(p-methoxyphenyl)-pentanone-1*

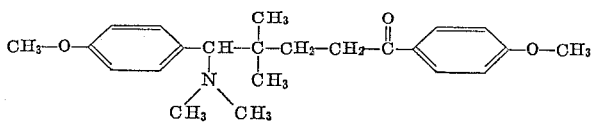

The Grignard reagent was prepared from 47 grams (0.25 mole) of p-bromoanisole and 6 grams (0.25 mole) magnesium as described in the hereinbefore preferred procedure. Methyl 2-dimethylamino-3,3-dimethylcyclobutane carboxylate, 18.7 grams (0.100 mole) in ether was added to the ethereal solution of p-methoxyphenyl magnesium bromide as in Example 1. The reaction mixture was refluxed for 45 minutes and worked up as in Example 1. The crude product, a viscous yellow oil, weighed 20 grams. Distillation of the oil in vacuo gave 15.5 (42%) grams of 4,4-dimethyl-5-dimethylamino-1,5-di(p-methoxyphenyl)-pentanone-1 as a clear yellow oil, B.P. 0.3 mm. 215–221° C.

*Analysis.*—Calculated for $C_{23}H_{31}O_3N$: C, 74.76; H, 8.46; N, 3.79. Found: C, 74.54, 74.60; H, 8.46, 8.47; N, 3.67, 3.80.

By infra-red examination absorption peaks were found at the following frequencies expressed as reciprocal centimeters (cm.$^{-1}$): 2820 and 2780 indicating the dimethylamino radical; 1675 indicating the carbonyl conjugated with an olefin or benzene; 1600, 1577 and 1510 indicating benzene; 1255 indicating a phenoxy group; and 837 indicating para-substituted benzene. No absorption peaks were found above 3200 indicating absence of the hydroxyl radical. The novel ketone solidified on standing and after recrystallization from ethanol it had a melting point of 65° C. to 67° C.

EXAMPLE 3

*Preparation of 4,4-dimethyl-5-dimethylamino-1,5-di(o-methoxyphenyl)pentanone-1*

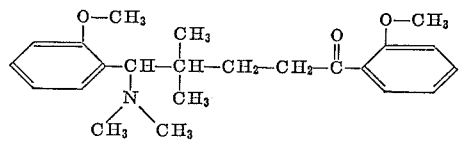

The Grignard reagent from 10.4 grams of magnesium (0.43 mole) and 78.6 grams (0.42 mole) of o-bromoanisole was prepared as in Example 1. A solution of 37.4 grams (0.20 mole) of methyl 2-dimethylamino-3,3-dimethylcyclobutane carboxylate in ether was added. After the addition of the ester was complete, the reaction mixture was refluxed for thirty minutes, cooled and poured into ice cold solution of 60 grams of ammonium chloride in 210 ml. of water. The ether layer was separated and the aqueous layer was extracted three times with two hundred ml. portions of ether. The combined ether extracts were dried over anhydrous sodium sulfate and concentrated in vacuo to a yellow solid weighing 70.5 grams. This solid was recrystallized from alcohol to give 44 grams (56%) of 4,4-dimethyl-5-dimethylamino-1,5 di(o-methoxyphenyl)-pentanone-1 having a melting point of 72–73° C. The product was in the form of fine yellow crystals.

*Analysis.*—Calculated for $C_{23}H_{31}O_3N$: C, 74.76; H, 8.46; N, 3.79; O, 12.99. Found: C, 75.09; H, 8.72; N, 3.91; O, 12.66.

9

By infra-red examination absorption peaks were found at the following frequencies expressed as reciprocal centimeters (cm.$^{-1}$): 2820 and 2780 indicating the dimethylamino radical; 1685 indicating a carbonyl conjugated with an olefinic linkage or benzene; 1600, 1585 and 1505 indicating benzene; 1240 indicating the phenoxy radical. No absorption peaks were found above 3200 indicating the absence of the hydroxyl radical.

EXAMPLE 4

*Preparation of 5,5-dimethyl-6-dimethylamino heptanone-2*

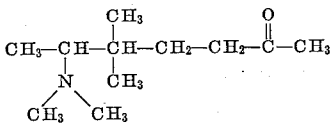

The Grignard reagent was prepared from 12.2 gms. (0.5 mole) of magnesium in 70 ml. of anhydrous ether and 71.0 gms. (0.5 mole) of methyl iodide as in the hereinbefore described preferred procedure. After the addition of the methyl iodide to the magnesium in ether, the mixture was refluxed for 45 minutes, cooled, and treated dropwise with 44.4 gms. (0.24 mole) of methyl 2-dimethylamino-3,3-dimethylcyclobutane carboxylate in 70 ml. of anhydrous ether. The addition of the ester to the methyl magnesium iodide was followed by the precipitation of a heavy, dark gray oil. The reaction mixture was refluxed for 1.5 hrs., cooled, and poured onto 400 gms. of ice and 30 ml. of concentrated sulfuric acid. This solution was extracted with 2×100 ml. of ether. The ether washings were discarded, and the aqueous layer was made alkaline with sodium carbonate and extracted with 3×200 ml. of ether. The ether layer was washed once with water, dried over anhydrous sodium sulfate and concentrated in vacuo. This gave 23 gms. of a pinkish-white clear oil. The crude product was refluxed for 1 hour with 3 N hydrochloric acid, made alkaline, and the crude ketone extracted with ether from the alkaline layer. This material was distilled once more to give the pure ketone, 5,5-dimethyl-6-dimethylamino-heptanone-2. The yield was 11.3 gms. of brownish oil. This oil was distilled at 0.8 mm., B.P. 93° C.

*Analysis.*—Calculated for $C_{11}H_{23}ON$: C, 71.30; H, 12.51; N, 7.56; O, 8.63. Found: C, 71.12; H, 12.39; N, 7.57; O, 8.95.

By infra-red examination absorption peaks were found at the following frequencies expressed as reciprocal centimeters (cm.$^{-1}$) for the heptanone of this example: 2820 and 2780 indicating the dimethylamino radical; 1718 indicating an unconjugated carbonyl radical. No peaks were found above 3200 indicating the absence of a hydroxyl radical.

The 2,4-dinitrophenyl hydrazone derivative of this novel ketone was prepared by the method described in Shriner, Fuson and Curtin, page 219 for identification, M.P. 174–175° C.

*Analysis.*—Calculated for $C_{17}H_{27}N_5O_4 \cdot H_2SO_4$: C, 44.05; H, 6.31; N, 15.11; and S, 6.9. Found: C, 44.14; H, 6.58; N, 15.01; and S, 6.58.

EXAMPLE 5

*Preparation of 4,4-dimethyl-5-dimethylamino-1,5 di(p-tolyl)-pentanone-1*

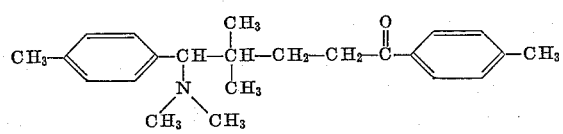

The Grignard reagent was prepared from 5.35 g. (0.22 mole) of magnesium in anhydrous ether and 37.6 g. (0.22 mole) of p-bromotoluene by conventional techniques. The Grignard reagent was treated dropwise with 18.7 g. (0.1 mole) of methyl 2-dimethylamino-3,3-dimethylcyclobutane carboxylate dissolved in anhydrous ether. The reaction, hydrolysis and recovery of the novel ketone was in accordance with the preferred procedure set forth hereinabove whereby there was recovered 20 g. (59%) of 4,4-dimethyl-5-dimethylamino - 1,5 - di(p-tolyl)-pentanone-1 which was in the form of a yellow oil having a boiling point of 197° C. at 0.3 mm.

*Analysis.*—Calculated for $C_{23}H_{31}ON$: C, 81.85; H, 9.26; N, 4.15. Found: C, 81.05; H, 9.32; N, 4.25.

The following absorption peaks expressed as reciprocal centimeters were found by infra-red examination for the pentanone of Example 5: 2820 and 2780 indicating the dimethylamino radical: 1680 indicating a conjugated carbonyl; 1608, 1575, 1512 indicating benzene; and 810 indicating parasubstituted benzene. No absorption peaks were found above 3200 indicating the absence of a hydroxyl radical.

The 2,4-dinitrophenyl hydrazone derivative of the novel pentanone of this example was produced by the method of the previously cited Shriner et al. reference.

*Analysis.*—Calculated for $C_{29}H_{35}N_4O_5$: C, 67.29; H, 6.82; N, 13.53. Found: C, 67.84, 67.53; H, 6.97, 7.22; N, 13.28, 1343.

EXAMPLE 6

*Preparation of 4,4-dimethyl-5-dimethylamino-1,5-di-(m-tolyl)-pentanone-1*

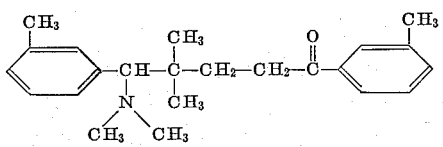

The Grignard reagent was prepared from 5.35 g. (0.22 mole) of magnesium and 37.6 g. (0.22 mole) of m-bromotoluene by the technique described in the hereinbefore described preferred procedure. The Grignard reagent was treated with 18.7 g. (0.1 mole) of methyl 3,3-dimethyl-2-dimethylaminocyclobutane carboxylate dissolved in anhydrous ether and the reaction mixture was worked up as described in the preferred procedure. There was obtained 20 g. (59%) of 4,4-dimethyl-5-dimethylamino-1,5-di(m-tolyl) pentanone-1 as a yellow oil having a boiling point of 178° C. to 180° C. at 0.1 mm. The following absorption peaks expressed as reciprocal centimeters were found by infra-red examination for the pentanone of Example 6: 2800 indicating dimethylamino; 1690 indicating a conjugated carbonyl radical; 1610, 1593 and 1495 indicating benzene; and 787 indicating meta-substituted benzene. No absorption peaks were found above 3200 indicating the absence of a hydroxyl radical.

The 2,4-dinitrophenyl hydrazone derivative of the novel pentanone of Example 6 was prepared by the method described in the Shriner et al. reference.

*Analysis.*—Calculated for $C_{29}H_{35}N_4O_5$: C, 67.29; H, 6.82; N, 13.53. Found: C, 66.81; H, 6.82; N, 13.53.

EXAMPLE 7

*Preparation of 4,4-dimethyl-5-dimethylamino-1,5-di(o-tolyl)-pentanone-1*

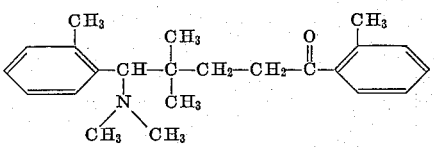

The Grignard reagent was prepared from 10.7 g. (0.44 mole) of magnesium and 75.2 (0.44 mole) of o-bromotoluene by the technique described in the hereinabove described preferred procedure. The Grignard reagent was treated with 37.4 g. (0.20 mole) of methyl 3,3-dimethyl-2-dimethylaminocyclobutane caboxylate dissolved in anhydrous ether and the reaction mixture was worked up as described in Example 4. There was obtained 50.8 g. (75.2%) of 4,4 - dimethyl-5-dimethylamino-1,5-di(o-tolyl)-pentanone-1 as a yellow oil having a boiling point of 182° C. to 184° C. at 0.5 mm. The following absorption peaks expressed as reciprocal centimeters were found by infra-red examination: 2820 and 2780 indicating dimethylamino; 1690 indicating a conjugated carbonyl radical; 1600, 1575 and 1495 indicating benzene; and 752 indicating ortho-substituted benzene. No absorption peaks were found above 3200 indicating the absence of a hydroxyl radical.

*Analysis.*—Calculated for $C_{23}H_{25}ONF_6$: C, 62.02; H, 5.68; N, 4.15; O, 4.74. Found: C, 81.16; H, 9.28; N, 4.69; O, 5.23.

EXAMPLE 8

*Preparation of 4,4-dimethyl-5-dimethylamino-1,5-di(m-trifluoromethylphenyl)-pentanone-1*

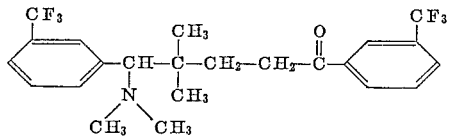

The Grignard reagent was prepared from 5.35 g. (0.22 mole) of magnesium and 49.5 g. (0.22 mole) of (m-trifluoromethylphenyl) bromide by the technique described in the hereinabove described preferred procedure. The Grignard reagent was treated with 18.7 g. (0.10 mole) of methyl 2-dimethylamino-3,3-dimethylcyclobutane carboxylate dissolved in anhydrous ether and the reaction mixture was worker up as described in the preferred procedure. There was obtained 22 g. (49.4%) of 4,4-dimethyl - 5-dimethylamino-1,5-di(m-trifluoromethylphenyl)-pentanone-1 as a yellow oil having a boiling point of 173° C. to 174° C. at 0.1 mm.

*Analysis.*—Calculated for $C_{23}H_{25}ONF_6$: C, 62.02; H, 5.68; N, 3.15. Found: C, 62.03, 62.22; H, 5.68, 5.64; N, 3.11, 3.20.

The following absorption peaks expressed as reciprocal centimeters were found by infra-red examination: 2800 indicating dimethylamino; 1700 indicating a conjugated carbonyl radical; 1600 and 1500 indicating benzene; 1340 and 1140 indicating the trifluoromethyl radical; and 812 indicating meta-substituted benzene.

The infra-red examinations of the novel ketones were done on the compounds as smears and thus no solvent was employed.

EXAMPLE 9

By following the procedure of Example 3, except for the particular Grignard reagent and cyclobutane carboxylate employed therein, there can be produced: 4,4-dipropyl-5-(1-piperidino) - 1,5 - di(3 - methoxyphenyl)-pentanone-1 by reacting methyl 2-(1-piperidino)-3,3-dipropylcyclobutane carboxylate with 3-methoxyphenyl-magnesium bromide; 4,4-diethyl-5-(1-morpholino)-1,5-di(4-dimethylaminophenyl)-pentanone-1 by reacting 4-dimethylaminophenylmagnesium bromide with methyl 2-(1-morpholino) - 3,3 - diethylcyclobutane carboxylate; and 4,4 - dibutyl-5-(4-methyl-1-piperazino)-1,5-dibenzyl-pentanone-1 by reacting benzylmagnesium bromide with propyl 2-(4-methyl-1-piperazino)-3,3-dibutylcyclobutane carboxylate.

EXAMPLE 10

A suitable formulation of tablets for analgesic use consists of:

| | Grams |
|---|---|
| (1) Hydrochloride salt of 4,4-dimethyl-5-dimethylamino-1,5-di(m-tolyl)-pentanone-1 | 25 |
| (2) Lactose | 30 |
| (3) Starch | 5 |
| (4) Magnesium stearate | 2 |

The pentanone derivative, lactose, magnesium stearate and starch are thoroughly mixed and the mixture tabletted on a rotary press. Use of this procedure produces 200 tablets each containing 125 mg. of the active analgesic agent.

It is to be understood that the foregoing examples are intended only to illustrate the invention, and in no sense to limit the invention to the specific reactants, reaction conditions, reaction products or manipulative techniques employed therein. The invention can be practiced broadly within the description thereof set forth hereinabove, and it is to be understood that any modifications or equivalents that would occur to one skilled in the art are to be considered as lying within the scope of this invention.

What is claimed is:

1. A compound of the formula:

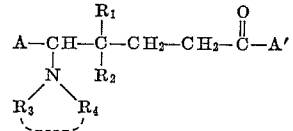

wherein each of $R_1$ and $R_2$ is alkyl having from 1 to 6 carbon atoms, each of A and A' is the organic residue selected from the group consisting of alkyl, cycloalkyl, phenyl, substituted phenyl, benzyl and substituted benzyl, each of which has a number of carbon atoms falling in the range of from 1 to 12; and

is selected from the group consisting of piperidino, pyrrolidino, morpholino, piperazino, lower alkyl substituted piperazino and thiomorpholino.

2. 4,4-dipropyl-5-(1-piperidino) - 1,5 - di(3-methoxyphenyl)-pentanone-1.

3. 4,4-diethyl-5-(1-morpholino) - 1,5 - di(4-dimethylaminophenyl)-pentanone-1.

4. 4,4-dibutyl-5-(4-methyl-1-piperazino)-1,5 - dibenzyl-pentanone-1.

5. A process for preparing amino ketones which comprises commingling in a molar ratio of at least 2 to 1 a Grignard reagent with a cyclobutane carboxylate of the formula:

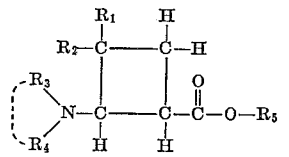

wherein each of $R_1$, $R_2$ and $R_5$ is alkyl having from 1 to 6 carbon atoms and

is selected from the group consisting of saturated heterocyclic tertiary amino groups having 1 ring nitrogen and from 4 to 6 carbon atoms; saturated heterocyclic tertiary amino groups having 2 ring nitrogens and from 3 to 5 carbon atoms; saturated heterocyclic tertiary amino groups having 1 ring nitrogen and 1 ring oxygen and from 3 to 5 carbon atoms; and saturated heterocyclic tertiary amino groups having 1 ring nitrogen and 1 ring sulfur and from 3 to 5 carbon atoms; said saturated heterocyclic tertiary amino group being further selected from the group consisting of unsubstituted and lower alkyl substituted heterocyclic tertiary amino groups; subjecting the resulting mixture to a temperature high enough to effect reaction between the Grignard reagent and cyclobutane carboxylate; and finally, hydrolyzing the resulting reaction product, said Grignard reagent being of Formula RM$_g$X, wherein X is a halogen having an atomic number of from 17 to 53 inclusive, and R is selected from the group consisting of alkyl, cycloalkyl, aryl, aralkyl and alkaryl radicals, each of which has a number of carbon atoms falling in the range of from 1 to 12.

6. A process according to claim 5 wherein the reaction temperature is in the range of from about 10° C. to 120° C.

7. A process for preparing an amino ketone which comprises commingling in a molar ratio of at least 2 to 1, 3-methoxyphenylmagnesium bromide and methyl-2-(1-piperidino)-3,3-dipropylcyclobutane carboxylate, subjecting the resulting mixture to a temperature high enough to effect reaction between these materials and finally hydrolyzing the resulting reaction product.

8. A process for preparing an amino ketone which comprises commingling in a molar ratio of at least 2 to 1, 4-dimethylaminophenylmagnesium bromide and methyl-2-(1-morpholino)-3,3-diethylcyclobutane carboxylate, subjecting the resulting mixture to a temperature high enough to effect reaction between these materials and finally hydrolyzing the resulting reaction product.

9. A process for preparing an amino ketone which comprises commingling in a molar ratio of at least 2 to 1, benzylmagnesium bromide and 2-(4-methyl-1-piperazino)-3,3-dibutylcyclobutane carboxylate, subjecting the resulting mixture to a temperature high enough to effect reaction between these materials and finally hydrolyzing the resulting reaction product.

References Cited by the Examiner

UNITED STATES PATENTS

| | | |
|---|---|---|
| 2,731,462 | 1/1956 | Ehrhart et al. |
| 3,080,372 | 3/1963 | Janssen. |
| 3,151,124 | 9/1964 | Huebner. |

OTHER REFERENCES

Eddy et al., J. of Pharm. and Expt. Therapeutics, vol. 98, pages 121–137 (note pages 125 and 136) RS1J6.

WALTER A. MODANCE, *Primary Examiner.*

JOHN D. RANDOLPH, *Examiner.*

A. D. SPEVACK, *Assistant Examiner.*